United States Patent [19]

Vogel, Jr. et al.

[11] Patent Number: 4,530,442
[45] Date of Patent: Jul. 23, 1985

[54] PLASTIC CONTAINER AND SEALING RING ASSEMBLY THEREFOR

[75] Inventors: William M. Vogel, Jr., Mendham, N.J.; Rolf E. Weingardt, Scarsdale, N.Y.; Waco J. O'Guin, Lakeland, Ga.; Joseph S. Littenberg, Springfield, N.J.

[73] Assignee: Standard Container Company, Fairfield, N.J.

[21] Appl. No.: 645,021

[22] Filed: Aug. 28, 1984

[51] Int. Cl.³ .............................................. B65D 43/06
[52] U.S. Cl. ........................... 220/354; 220/DIG. 14; 220/DIG. 25; 220/73
[58] Field of Search ................... 220/352–358, 220/307, DIG. 14, DIG. 11, DIG. 25, 73, 74; 206/509, 515; 150/55

[56] References Cited

U.S. PATENT DOCUMENTS 3,995,763  12/1976  Ayres et al. ............................ 220/74
4,228,916  10/1980  Weingardt ............................ 220/354

Primary Examiner—George T. Hall
Attorney, Agent, or Firm—Lerner, David, Littenberg, Krumholz & Mentlik

[57] ABSTRACT

A plastic sealing ring is attached to a rim of a plastic container with an insert interposed between the rim and the sealing ring. By making the insert from a relatively rigid material, the insert can rigidify the sealing ring and hence the container. If the insert is made from an electrically conductive material, the insert can function to facilitate the induction welding of the sealing ring to the container. The sealing ring and insert can be formed as a unitary, composite sealing ring subassembly adapted for direct application to the rim of the container or they can be supplied as individual parts adapted to be applied to the rim of the container separately. In order to form the sealing ring subassembly, the sealing ring is molded from molten plastic. During the cooling of the sealing ring, the insert is positioned in a groove formed in the sealing ring. By maintaining the insert in the groove until the sealing ring completely cools, the shrinkage of the sealing ring during its cooling effectively locks the insert in the groove.

24 Claims, 3 Drawing Figures

PLASTIC CONTAINER AND SEALING RING ASSEMBLY THEREFOR

FIELD OF THE INVENTION

The present invention relates to plastic containers, and, more particularly, to such containers which are especially adapted to hold paint.

BACKGROUND OF THE INVENTION

The paint cans most widely used at the present time employ a cylindrical metal container which is provided with a double-tight metal sealing ring attached to a top rim of the container. The primary advantage of this old design is that the double-tight sealing ring affords an excellent seal which can be opened and resealed repeatedly.

Notwithstanding the popularity of the metal paint cans with double-tight metal sealing rings and their extensive use in the paint industry, these cans do suffer from some rather significant disadvantages. For instance, the conventional metal can is expensive to produce because of the costs involved in purchasing the sheet metal from which the can is fabricated and then coating the can to prevent rust. A rust preventer is also applied to the sheet metal used to make the double-tight sealing ring. However, when the sheet metal is cut to form a ring blank from which the sealing ring is formed, subsequently a raw uncoated inner end of metal remains after the sealing ring has been formed. Thus, another problem is that paint may be discolored by rust which forms on the inner end of the sealing ring and falls into the container. The sealing ring fabrication process is also time consuming and expensive.

In an effort to avoid the problems and disadvantages discussed above, plastic paint cans have been proposed. Many of these plastic paint cans employ a snap-on lid which, because of the resiliency required to snap onto a rim of the can, must also be made from plastic or a similar material (see, for instance, U.S. Pat. Nos. 3,609,263; 3,804,289; 4,037,748 and 4,210,258). One problem associated with such plastic paint cans is that the plastic lids can be punctured or ruptured more easily than their metal counterparts. Another disadvantage is that the prior art paint cans which employ snap-on lids are not compatible with the plug-type lids employed by conventional metal paint cans. Also, many of these plastic paint cans are not compatible with existing paint can handling, filling and bailing equipment.

Plastic paint cans have also been proposed which employ plug-type lids (see, for instance, U.S. Pat. Nos. 3,730,382; 3,817,420 and 4,201,311). These lids are adapted to engage sealing rings or similar elements formed monolithically with the cans. A major problem associated with these plastic paint cans is that they lack the necessary rigidity to maintain their cylindrical shape, and, therefore, they tend to distort when subjected to a large load, such as when the cans are stacked one on top of the other.

So as to avoid the problems associated with the plastic paint cans described above, the assignee of the present invention and application developed a unique plastic paint container having a double-tight metal sealing ring which, due to its metallic construction, enhances the rigidity of the container (see U.S. Pat. No. 4,228,916). Moreover, because a conventional double-tight metal sealing ring is employed, the container can be sized and shaped so as to be compatible with existing paint can filling, handling and bailing equipment. Although the assignee of the present invention and application has successfully marketed this composite plastic paint container for a number of years, there is still room for additional improvement. For instance, the metal sealing ring is relatively expensive. Also, because of its metallic construction, the sealing ring increases the overall weight of the container and still poses a potential rust problem. A still further disadvantage is that the metal sealing ring adds an additional manufacturing step in order to seam the sealing ring to the container. If the metal sealing ring of the paint container disclosed in U.S. Pat. No. 4,228,916 were replaced by a plastic sealing ring, the seaming operation could be dispensed with and the sealing ring would be attached to the container by a suitable adhesive. Alternatively, the seaming operation used to attach the metal sealing ring to the container could be replaced by an induction welding operation, such as the one disclosed in U.S. Pat. No. 2,741,402 which involves inserting a metal ring in a seam between two container parts and subjecting the assembly to induction heating, the metal ring localizing the heat in the vicinity of the seam to facilitate the induction welding operation.

An essentially all plastic paint container made from a plastic bucket and a separate plastic sealing ring has not been developed in the past. One reason is that the use of a separate plastic sealing ring would still require an additional manufacturing step (i.e., an induction welding operation), as compared with the much more popular technique of forming the sealing ring monolithically with the container. Thus, the concept of forming a plastic paint container from a plastic bucket and a separate sealing ring, whether plastic or metallic, represents a significant departure from the conventional and widely accepted practice of forming plastic paint containers monolithically (i.e., by molding the plastic sealing ring and the container as a unitary structure). Another reason for the lack heretofore of a plastic paint container made from a plastic bucket and a separate plastic sealing ring is that while the use of a metal sealing ring has the advantage of rigidifying the plastic container, the use of an unreinforced plastic sealing ring would not provide such an advantage.

SUMMARY OF THE INVENTION

In accordance with one aspect of the present invention, a sealing ring subassembly for a plastic container includes a sealing ring made from a plastic material and an insert or an equivalent part fixedly positioned in a groove formed in the sealing ring. When the sealing ring subassembly is applied to a rim of the container, the insert is in juxtaposition with the rim of the container. If the insert is made from a material, such as metal, which is more rigid than the plastic used to make the sealing ring, the insert rigidifies the sealing ring subassembly and hence the container to thereby inhibit the deformation of the sealing ring and the container, whereby the container may more readily maintain its cylindrical shape. The insert can be provided with an inverted L cross-sectional shape which further rigidifies the sealing ring and the container. If the insert is made from an electrically conductive material, the insert also facilitates the induction welding of the sealing ring subassembly to the container by focusing the heat generated during the induction welding operation along the joint between the container and the sealing ring subassembly.

By providing the insert with perforations, the molten plastic produced during the induction welding of the sealing ring to the container flows into the perforations where it solidifies to thereby enhance the bond between the container and the sealing ring subassembly. The inverted L cross-sectional shape of the insert also enhances the induction welding operation by focusing the heat generated during the induction welding operation along at least two sealing surfaces between the sealing ring and the container.

In accordance with another aspect of the present invention, the sealing ring subassembly is formed by molding the sealing ring from molten plastic and then positioning the insert or equivalent part in the groove of the sealing ring as the sealing ring cools. By maintaining the insert in the groove until the sealing ring completely cools, the shrinkage of the sealing ring during its cooling effectively locks the insert in the groove. Because the resulting sealing ring subassembly is a composite unitary structure, the sealing ring subassembly can be manufactured at one location and then shipped to one or more different locations for application by induction welding or otherwise to containers made at such other locations.

Of course, the sealing ring and the insert may be provided as separate pieces in which case the insert would be applied to the rim of the container followed by the application of the sealing ring to the rim of the container. If such a manufacturing process is employed, the L cross-sectional shape of the insert is particularly advantageous because it permits the insert to be supported directly by the rim of the container without having to provide the rim with a cutout or similar retaining mechanism.

Regardless of the method employed to make the sealing ring, the resulting container is superior to the prior art plastic paint cans. For instance, because the container and the sealing ring are manufactured separately, the container itself is easier to manufacture than plastic containers which, due to their monolithic construction, must be molded together with the sealing rings or similar devices. The separate manufacture of the container and the sealing ring is also advantageous because it allows the rigidity of the container to be enhanced by rigidifying the sealing ring. Thus, for instance, the sealing ring can be made from a plastic material containing inert fillers, such as glass, selected to enhance the rigidity of the sealing ring. The container could be manufactured from the same plastic material, such as polypropylene, without the inert fillers.

BRIEF DESCRIPTION OF THE DRAWINGS

For a more complete understanding of the present invention, reference is made to the following detailed description of the invention considered in conjunction with the accompanying drawings, in which.

DESCRIPTION OF THE EXEMPLARY EMBODIMENT

Although the present invention is applicable to many different types of plastic containers, it is especially suitable for use in connection with plastic paint cans. Accordingly, the present invention will be described in connection with a plastic paint can.

Figure 1:
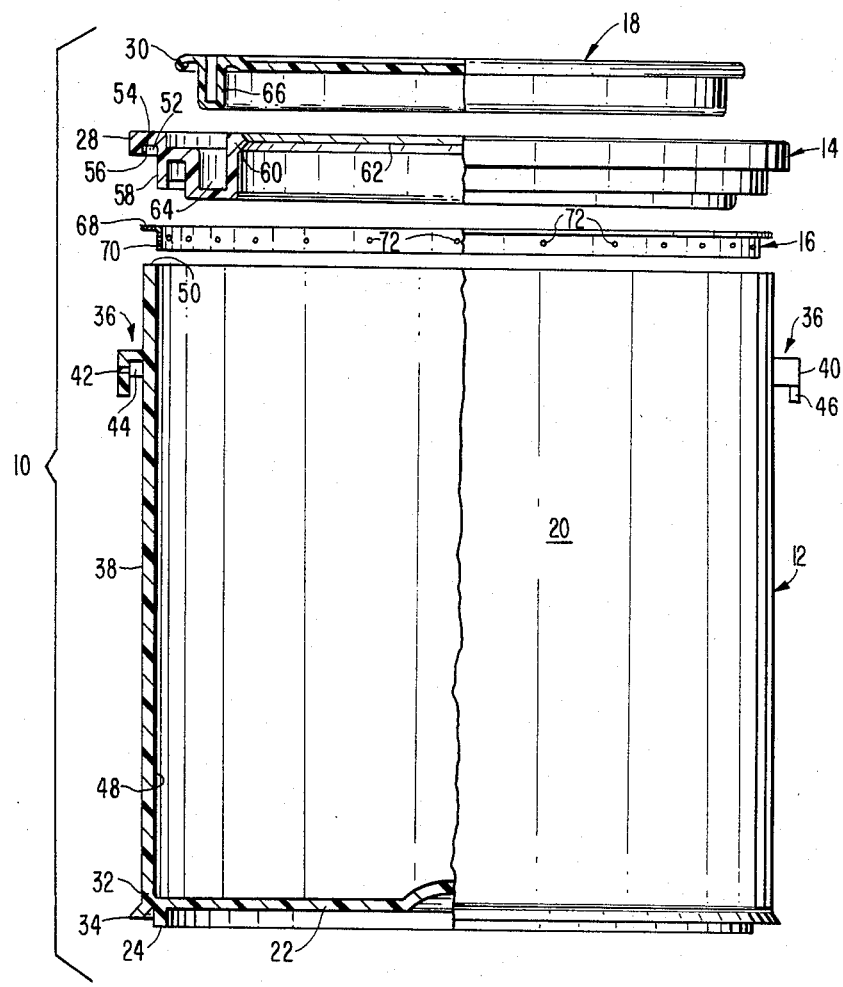
FIG. 1 is an exploded view of an exemplary embodiment of a plastic paint can constructed in accordance with the present invention, a portion of the paint can being broken away to facilitate consideration and discussion.
Figure 2:
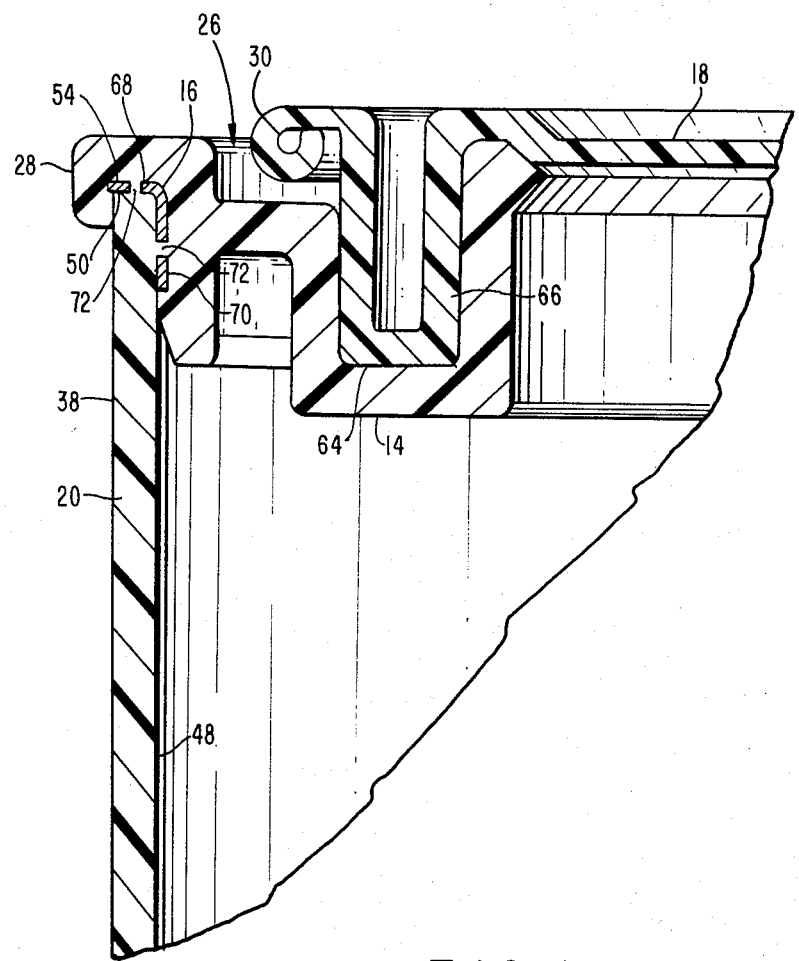
FIG. 2 is a cross-sectional view of an upper portion of the plastic paint can illustrated in FIG. 1.
Figure 3:
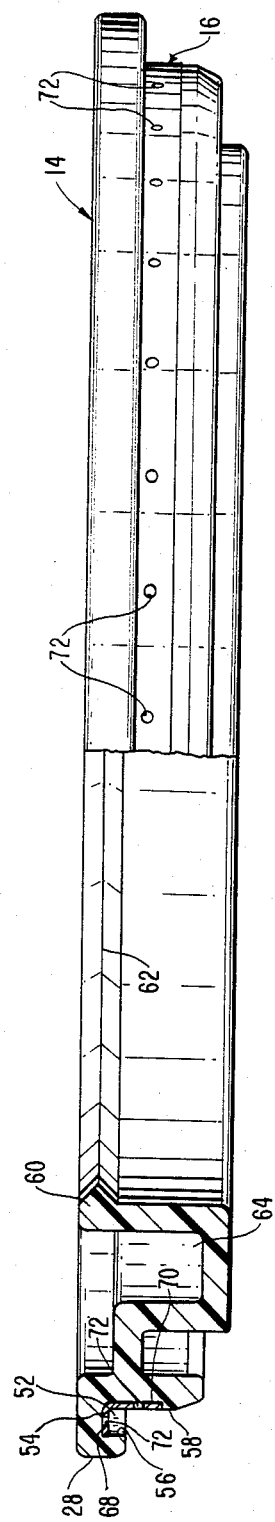
FIG. 3 is a partial cross-sectional view of a composite sealing ring subassembly which may be employed to make the paint container illustrated in FIGS. 1 and 2, a portion of the sealing ring subassembly being broken away to facilitate consideration and discussion.

Referring to FIGS. 1 and 2, a plastic paint can 10 includes a cylindrical plastic container 12, a plastic double-tight sealing ring 14, a circular band 16 inserted between the container 12 and the sealing ring 14 and a lid 18 designed to releasably mate with the sealing ring 14. What follows is a more detailed description of each element which makes up the paint can 10.

The container 12, which is made from any suitable plastic material (e.g., polypropylene or a high density polyethylene) by any suitable conventional molding process, has a substantially vertical sidewall 20 and a bottom wall 22 formed monolithically therewith. The bottom wall 22, which can have reinforcing ribs (not shown) formed therein, is spaced slightly above a lower rim 24 of the container 12, so that the container 12 rests on the lower rim 24 and not on the bottom wall 22. The outer diameter of the lower rim 24 is slightly less than the outer diameter of the sidewall 20, the difference in diameters being selected so as to position the lower rim 24 directly below an annular channel 26 formed between an outer circumferential edge 28 of the sealing ring 14 and an outer curl 30 on the lid 18, whereby the paint can 10 may be stacked on another such plastic paint can, on a conventional metal paint can with a metal sealing ring or on the composite paint can described and illustrated in U.S. Pat. No. 4,228,916.

Because the sidewall 20 is straight, the outside dimensions of the container 12 can be substantially identical to those of conventional metal paint cans. In order to completely assimilate conventional metal paint cans, a lower end 32 of the sidewall 20 is provided with an annular bead 34 having an outer diameter which matches the outer diameter of the sealing ring 14. The container 12 is thus compatible with existing filling and handling equipment and can be substituted for the conventional metal paint can without the need to invest in new filling and handling equipment.

A pair of ears 36 is formed monolithically with the sidewall 20 of the container 12. The ears 36 are located diametrically opposite to each other and extend outwardly from an exterior cylindrical surface 38 of the sidewall 20. Each of the ears 36 has an outer face 40 provided with a hole 42 which communicates with a cavity 44. Depending upon the design of the ears 36, the holes 42 can be round or elliptical, but their lateral dimension must be large enough to receive one end of a wire bail (not shown) for the container 12. The outer face 40 of each of the ears 36 has a downwardly projecting and tapering apron 46, which is designed to provide gauging surfaces for an automatic bail-inserting machine.

The sidewall 20 also has an interior cylindrical surface 48 which is concentric with the exterior cylindrical surface 38. The exterior surface 38 and the interior surface 48 terminate in an upper rim 50 of the container 12.

The sealing ring 14, which is attached to the upper rim 50 of the container 12 by induction welding or any other suitable method, includes a circular downwardly opening groove 52 provided in the outer circumferential edge 28 of the sealing ring 14. The groove 52 is sized and shaped so as to receive the upper rim 50 of the container 12. More particularly, the groove 52 includes a closed end 54 positioned adjacent to the upper rim 50 of the container 12, an outer circumferential wall 56 positioned adjacent to the exterior surface 38 of the container 12 and an inner circumferential wall 58 positioned adjacent to the interior surface 48 of the container 12. The sealing ring 14 also has an inner circumferential edge 60 which delimits a central opening 62 sized and shaped so as to receive the lid 18. An upwardly opening trough 64 is formed in the sealing ring 14 between its outer circumferential edge 28 and its inner circumferential edge 60. The trough 64 is sized and shaped so as to receive an annular sealing rib 66 on the lid 18. The sealing ring 14 is made from a plastic material, such as polypropylene or a high density polyethylene. In order to enchance the rigidity of the sealing ring 14 and hence the rigidity of the container 12, the plastic material for the sealing ring 14 can be provided with inert fillers, such as glass. Except for its plastic construction, the sealing ring 14 is essentially identical to a conventional metal sealing ring for paint cans.

The rigidity of the sealing ring 14 is further enhanced by the band 16 due, in part, to its metallic construction and, in part, to its inverted L cross-sectional shape. More particularly, the band 16 has a radial portion 68 positioned between the closed end 54 of the groove 52 in the sealing ring 14 and the upper rim 50 of the container 12, as well as an axial portion 70 positioned between the interior surface 48 of the container 12 and the inner wall 58 of the groove 52 in the sealing ring 14. Both the radial portion 68 and the axial portion 70 of the sealing ring 14 are provided with perforations 72 for a purpose to be described hereinafter. Because the band 16 is essentially embedded in plastic, it poses no serious rust problem.

The lid 18 is made from a plastic material, such as polypropylene or high density polyethylene. Except for its plastic construction, the lid 18 is essentially identical to a conventional metal lid for paint cans. The lid 18 can be made from metal if it is desired to further enhance the rigidity of the paint can 10.

The container 12, the sealing ring 14, the band 16 and the lid 18 can be provided separately. In order to assemble the paint can 10 from these separate parts, the band 16 would be applied to the upper rim 50 of the container 12, the inverted L cross-sectional shape facilitating the proper positioning of the band 16 on the upper rim 50. The sealing ring 14 would then be applied to the upper rim 50 of the container 12 such that the radial portion 68 of the band 16 is positioned between the closed end 54 of the groove 52 in the sealing ring 14 and the upper rim 50 of the container 12, while the axial portion 70 of the band 16 is positioned between the interior surface 48 of the container 12 and the inner wall 58 of the groove 52 in the sealing ring 14. The sealing ring 14 can be fixedly attached to the upper rim 50 of the container 12 by a suitable adhesive or by induction welding. If the sealing ring 14 is induction welded to the upper rim 50 of the container 12, the band 16, as a result of its electrical conductivity, facilitates the induction welding operation by focusing the heat generated during the induction welding operation along at least two sealing surfaces of the inverted U-shaped or inverted J-shaped joint formed between the upper rim 50 of the container 12 and the sealing ring 14. The perforations 72 in the sealing ring 14 permit the passage of molten plastic from the container 12 and the sealing ring 14 during the induction welding operation, whereby the bond between the container 12 and the sealing ring 14 is enhanced as a result of the solidification of the molten plastic in the perforations 72.

The sealing ring 14 and the band 16 can also be formed as a composite subassembly by injection molding the sealing ring 14 and then inserting the band 16 in the groove 52 during the cooling of the sealing ring 14. The band 16 is maintained in the groove 52 until the sealing ring 14 is completely cooled, so that the shrinkage of the sealing ring 14 during its cooling locks the band 16 in the groove 52. The resulting subassembly can be applied to the upper rim 50 of the container 12 as a unitary structure and thereafter attached to the container 12 by a suitable adhesive or by induction welding.

The container 12, the sealing ring 14 and the lid 18 are specifically designed so as to assimilate their counterparts in a conventional metal paint can. Thus, the plastic paint can 10 is designed so as to be compatible with conventional paint can handling, filling and bailing equipment.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. A composite sealing ring subassembly for a plastic container adapted to be induction welded to said sealing ring subassembly, comprising a sealing ring made from a plastic material, said sealing ring having a central opening sized and shaped so as receive a closure for the container and a circular groove sized and shaped so as to receive a rim of the container, and an insert made from an electrically conductive material, said insert being fixedly positioned in said groove in said sealing ring so as to be in juxtaposition with the rim of the container when said sealing ring subassembly is applied to the container, whereby said insert facilitates the induction welding of said sealing ring subassembly to the container by focusing the heat generated during the induction welding operation along the joint between the container and said sealing ring subassembly.

2. A composite sealing ring subassembly according to claim 1, wherein said insert is a circular band made from a metallic material having a rigidity selected so as to maintain the circular shape of said band, whereby said band rigidifies said sealing ring subassembly.

3. A composite sealing ring subassembly according to claim 1, wherein said insert includes perforations sized and shaped so as to permit the passage of molten plastic from the container and said sealing ring during the induction welding of said sealing ring subassembly to the container, whereby the bond between the container and said sealing ring subassembly is enhanced when the molten plastic solidifies.

4. A composite sealing ring subassembly according to claim 1, wherein said groove in said sealing ring includes a closed end, an inner circumferential wall and an outer circumferential wall, whereby the joint between the container and said sealing ring subassembly has an inverted U or J cross-sectional shape, and wherein said insert includes a first surface positioned adjacent to said closed end of said groove and a second surface positioned adjacent to one of said walls of said groove, whereby said insert facilitates the induction welding of said sealing ring subassembly to the container by focusing the heat generated during the induction welding operation along at least two sides of the inverted U-shaped or J-shaped joint between said sealing ring subassembly and the container.

5. A composite sealing ring subassembly according to claim 4, wherein said second surface of said insert is positioned adjacent to said inner circumferential wall of said groove in said sealing ring.

6. A composite sealing ring subassembly according to claim 5, wherein said insert has an inverted L cross-sectional shape.

7. A composite sealing ring subassembly according to claim 1, wherein said sealing ring is a double-tight sealing ring for a paint can.

8. A composite sealing ring subassembly for a plastic container adapted to be induction welded to said sealing ring subassembly, comprising a double-tight sealing ring made from plastic, said sealing ring having a central opening sized and shaped so as to receive a lid for the container and a circular groove sized and shaped so as to receive a rim of the container, and a metallic band fixedly positioned in said groove of said sealing ring so as to be in juxtaposition with the rim of the container when said sealing ring subassembly is applied to the container, whereby said band rigidifies said sealing ring subassembly and facilitates the induction welding of said sealing ring subassembly to the container by focusing the heat generated during the induction welding operation along the joint between the container and said sealing ring subassembly, said band having a first surface positioned adjacent to a closed end of said groove, a second surface positioned adjacent to an inner circumferential wall of said groove and perforations sized and shaped so as to permit the passage of molten plastic from the container and said sealing ring during the induction welding of said sealing ring subassembly to the container, whereby the bond between the container and said sealing ring subassembly is enhanced when the molten plastic solidifies.

9. A composite sealing ring subassembly according to claim 8, wherein said band has an inverted L cross-sectional shape.

10. A plastic container, comprising a closed end, an open end which terminates in a rim, a sidewall extending between said closed end and said open end and including an exterior cylindrical surface and an interior cylindrical surface, a plastic double-tight sealing ring induction welded to said rim and having a central opening sized and shaped so as to receive a lid for said container and a circular groove sized and shaped so as to receive said rim, said groove including a closed end positioned adjacent to said rim, an inner circumferential wall positioned adjacent to said interior cylindrical surface of said sidewall and an outer circumferential wall positioned adjacent to said exterior cylindrical surface of said sidewall, and a circular band made from electrically conductive material, said band including a first portion positioned between said closed end of said groove in said sealing ring and said rim and a second portion positioned between said interior cylindrical surface of said sidewall and said inner circumferential wall of said groove in said sealing ring, whereby said band facilitates the induction welding of said sealing ring to said rim by focusing the heat generated during the induction welding operation along two sealing surfaces between said sealing ring and said rim.

11. A plastic container according to claim 10, wherein said band is made from a metallic material.

12. A plastic container according to claim 10, wherein said band includes perforations sized and shaped so as to permit the passage of molten plastic from said rim and said sealing ring during the induction welding of said sealing ring to said rim, whereby the bond between said rim and said sealing ring is enhanced when the molten plastic solidifies.

13. A plastic container according to claim 10, wherein said band has an inverted L cross-sectional shape.

14. A plastic container according to claim 10, wherein said container is sized and shaped so as to be compatible with conventional paint can handling, filling and bailing equipment.

15. A plastic container according to claim 10, wherein said sealing ring is made from a plastic material containing inert fillers selected to enhance the rigidity of said sealing ring.

16. A plastic container according to claim 15, wherein said bucket and said sealing ring are made from polypropylene.

17. A reinforced sealing ring subassembly for a cylindrical plastic container, comprising a circular sealing ring made from a plastic material, said sealing ring having a central opening sized and shaped so as to receive a closure for the container and a circular groove sized and shaped so as to receive a rim of the container, and reinforcing means, positioned in said groove in said sealing ring so as to be in juxtaposition with the rim of the container when the sealing ring is applied to the rim, for reinforcing said sealing ring so as to maintain the circular shape thereof whereby said reinforcing means also helps maintain the cylindrical shape of the container.

18. A reinforced sealing ring subassembly according to claim 17, wherein said reinforcing means is a circular band made from a metallic material.

19. A reinforced sealing ring subassembly according to claim 18, wherein said band has an inverted L cross-sectional shape.

20. A reinforced sealing subassembly according to claim 17, wherein said sealing ring is a double-tight sealing ring for a paint can.

21. A plastic container, comprising a closed end, an open end which terminates in a rim, a sidewall extending between said closed end and said open end and including an exterior cylindrical surface and an interior cylindrical surface, a plastic double-tight sealing ring attached to said rim and having a central opening sized and shaped so as to receive a lid for said container and a circular groove sized and shaped so as to receive said rim, said groove including a closed end positioned adjacent to said rim, an inner circumferential wall positioned adjacent to said interior cylindrical surface of said sidewall and an outer circumferential wall positioned adjacent to said exterior cylindrical surface of said sidewall, and reinforcing means for reinforcing said sealing ring and said rim, said reinforcing means being positioned between said closed end of said groove in said sealing ring and said rim and between said interior cylindrical surface of said sidewall and said inner circumferential wall of said groove in said sealing ring, whereby said container may maintain a substantially cylindrical shape.

22. A plastic container according to claim 21, wherein said reinforcing means is a circular band made from a metallic material.

23. A plastic container according to claim 22, wherein said band has an inverted L cross-sectional shape.

24. A plastic container according to claim 21, wherein said container is sized and shaped so as to be compatible with paint can handling, filling and bailing equipment.

* * * * *